United States Patent [19]
Kuderer et al.

[11] Patent Number: 5,303,027
[45] Date of Patent: Apr. 12, 1994

[54] PHOTODIODE ARRAY

[75] Inventors: Hubert Kuderer, Waldbronn; Stefan Rohrer, Schramberg, both of Fed. Rep. of Germany

[73] Assignee: Hewlett-Packard Company, Palo Alto, Calif.

[21] Appl. No.: 900,953

[22] Filed: Jun. 18, 1992

[30] Foreign Application Priority Data

Jun. 20, 1991 [EP] European Pat. Off. ........ 91110156.6

[51] Int. Cl.$^5$ ........................... G01J 3/42; H01J 40/14
[52] U.S. Cl. .................................. 356/328; 250/208.2
[58] Field of Search ................... 356/319, 326, 328; 250/208.1, 208.2

[56] References Cited

U.S. PATENT DOCUMENTS

| | | | |
|---|---|---|---|
| 4,134,683 | 1/1979 | Goetz et al. | 356/407 |
| 4,558,301 | 12/1985 | Trofimenkoff et al. | 340/347 |
| 4,740,080 | 4/1988 | Donohue et al. | 356/326 |

FOREIGN PATENT DOCUMENTS

| | | |
|---|---|---|
| 0118919 | 9/1984 | European Pat. Off. |
| 0192200 | 8/1986 | European Pat. Off. |
| 0266682 | 5/1988 | European Pat. Off. |
| 2373781 | 7/1978 | France |
| 1568530 | 5/1980 | United Kingdom |

Primary Examiner—F. L. Evans

[57] ABSTRACT

A photodiode array comprises a plurality of n channels, each channel having a photodiode which is reverse biased such that it acts as a current source. Each channel further comprises an A/D converter for providing a digital output signal (DATA) which is representative o the photo current (Iph) provided by the photodiode and therefore of the intensity of the light impinging on the photodiode. The A/D converter comprises a controllable current source, an integrator circuit, a comparator for comparing the output signal (Vout) of the integrator with a predetermined signal (Vthreshold), a logic circuit for controlling the current source in response to the output signal (Vcomp) of the comparator such that Vout is kept within a certain range. Preferably, the current source provides current in the form of charge dumps to and/or from the integrator. The number of dumps in one direction is counted by a counter and is a digital measure of the photo current (Iph). The photodiode array is particularly useful in spectrophotometers since the provision of a separate A/D converter for each channel allow simultaneous processing of all the photosignals in the array so that spectra distortions arising from time delays in processing the photosignals are avoided.

8 Claims, 8 Drawing Sheets

PHOTODIODE ARRAY

FIELD OF THE INVENTION

The invention relates to a photodiode array. A photodiode array is a, typically linear, arrangement of photosensitive elements which produces output signals indicative of the intensity of the light intercepted by the individual photosensitive elements Photodiode arrays are used, for example, in spectrophotometers to detect the light which has passed through a sample to be analyzed and which has thereafter been diffracted by a diffraction grating.

BACKGROUND OF THE INVENTION

A spectrophotometer using a photodiode array is known from "A High-Speed Spectrophotometric LC Detector", Hewlett-Packard Journal, April 1984. This known spectrometer is used in a liquid chromatograph for analyzing the substances eluting from the chromatographic column. In this spectromter, a broad spectrum of ultraviolet and visible radiation is transmitted through a sample cell through which the sample eluting from the column passes. After transmission through the sample cell, the spectrum of the radiation as modified by the sample substances is derived by means of a diffraction grating which directs light rays of different wavelengths into different directions. A linear array of photodiodes is arranged to receive the light diffracted by the grating. Each diode thus receives light corresponding to a different wavelength range.

The photodiode array used in the mentioned spectrophotometer is of the type "selfscanning photodiode array". Such a selfscanning photodiode array is built on semiconductor material and comprises a plurality of photocells each photocell consisting of a photosensitive element (photodiode) and a capacitor which represents the junction capacitance of the photodiodes or which is separately added on the semiconductor chip. The photocells are connected via electronic switches to a common output line (video line) which in turn is connected to an external charge amplifier. The switches of the individual photocells are controlled by a shift register such that the photocells are read sequentially according to the clock signals of the shift register. In operation, the capacitors of the photocells which have initially been charged to a fixed value are discharged by the current generated by the photodiodes when light impinges on them. These capacitors are periodically recharged to the initial value whereby the amount of charge transferred is representative of the amount of light which has impinged on the photodiode during the integration period. The recharging of the capacitors is performed sequentially starting from the photocell at one end of the array to the photocell at the other end of the array. The transfer of charge to a photocell causes a voltage change at the output of the charge amplifier and thus produces a signal indicative of the light intensity on the photodiode. This signal is then converted to a digital signal by an analog-to-digital (A/D) converter common to all photodiodes of the array. The thus obtained digital signals can then be further processed by data processing means to generate a spectrum corresponding to the sample to be analyzed.

A second type of photodiode arrays are so-called "random access photodiode arrays". Their structure is similar to the selfscanning photodiode arrays in that they comprise a plurality of photocells connected to a common video line and to a subsequent common charge amplifier and an A/D converter. The difference to the selfscanning photodiode arrays consists in the way how the switches of the photocells are controlled : The shift register is replaced by an address decoder which gives the possibility to randomly select the switches to be activated so that any photocell can be chosen in any order.

A third type of photodiode arrays are so-called "multi element photodiode arrays". They typically comprise a number of less than about 50 photodiodes linearly arranged on a silicon chip without additional circuitry for operating the photodiode array on the chip. The one side of each photodiode is directly brought out from the chip while the other sides are commonly connected to the substrate on the chip . These photodiode arrays can be operated in two modes: In the first mode, each photodiode is connected to an operational amplifier which serves for signal conditioning. The output signals of these amplifiers are time multiplexed and supplied to a common A/D converter. Due to the amplifiers associated with each photocell, this configuration is very complex. In a less complex, alternative configuration, the multiplexer is arranged between the array of photodiodes and a common operational amplifier. In this configuration, however, the fidelity of the signals is impaired.

The multi element photodiode arrays thus operate in a sampling mode whereas the selfscanning and random access photodiode arrays operate in an integrating mode, i.e., the photocurrent of a photocell is accumulated during the time when the signal from a different photocell is processed.

The photodiode arrays operated in an integrating mode, i.e., selfscanning and random access photodiode arrays, lead to a problem called spectra distortion which will be explained in the following:

This problem of spectra distortion occurs in spectrophotometers wherein the sample to be analyzed is changing as a function of time. A typical example is a spectrophotometer used to detect the sample substances eluting from the column of a liquid chromatograph. In that case, different sample components are detected by the spectrophotometer at different times; furthermore, even with a pure sample substance, the corresponding sample concentration is a function of time in accordance with the chromatographic peak having a rising edge, a top, and a falling edge. Since the signals from the individual photocells in an integrating phototdiode array are processed sequentially, the photodiodes on one side of the array, corresponding to the shorter wavelengths of the spectrum, monitor the short wavelength radiation earlier than the photodiodes on the other side monitor the long wavelength radiation. When monitoring a chromatographic peak corresponding to a certain substance separated in the column, the resulting wavelength spectrum obtained at the top of such a peak (apex spectrum) is different to the spectrum obtained at the rising edge of the peak (upslope spectrum) which again is different to the spectrum obtained at the falling edge of the peak. In the upslope spectrum, the higher wavelengths are over-accentuated because the sample concentration rises during the spectrum accumulation which proceeds from lower to higher wavelengths. In the downslope spectrum, the lower wavelengths are over-accentuated because the sample concentration decreases so that upon processing of the higher wavelengths a smaller sample concentration prevails than at the processing of the lower wavelengths.

Since sample substances are identified by comparison of the measured spectra with spectra stored in an electronic library, the above described spectra distortion limits the capabilities to identify unknown sample substances.

In liquid chromatography, it may occur that two different sample constituents are not completely separated in the chromatographic column so that the corresponding peaks in the chromatogram are not resolved but form a single peak. A method for determining if a peak in a chromatogram represents a single or more constituents is the "peak purity check". This peak purity check consists in the comparison of the upslope wavelength spectrum of a peak with the downslope spectrum at the corresponding sample concentration. If both spectra coincide closely, there is a confirmation that the chromatographic peak represents a single constituent. However, if the spectral scans do not coincide, there is a strong indication that another constituent is contributing to the peak. Due to the above mentioned spectra distortion, the peak purity check can only be applied if the change in sample concentration during the integration interval is small or if the sample concentration is kept constant for a while by stopping the flow of the sample substances. The stopping of the flow through the separation column and the sample cell, however, is often not desirable because this introduces disturbances which impair the quantitative accuracy of the chromatographic measurement.

A prior art approach for coping with the described problem of spectra distortion is described in EP-A-0 192 200. According to this prior art, the photodiode array is of the type multi element photodiode array having 35 diodes wherein each photodiode is connected to an operational amplifier for signal conditioning and a sample and hold circuit for sampling and holding the output signals of the operational amplifiers. The output signals of the sample and hold circuits are multiplexed by a multiplex switch and then sequentially converted by a single A/D converter into digital signals. The circuitry of this known device is very complex because it requires an operational amplifier and a sample and hold circuit for each of the photodiodes as well as a multiplexer with a number of channels corresponding to the number of photodiodes and a high performance A/D converter. Furthermore, all electronic components are built discretely on a printed circuit board thus requiring a large board space and a great amount of supply power.

An additional problem with known photodiode arrays originates from the A/D conversion of the signals corresponding to the light incident on the photodiodes. In all of the above mentioned types of photodiode arrays, a single A/D converter is used which successively converts the signals from the individual photodiodes. Since the number of photodiodes used in spectrophotometic applications is very large (up to 1024 photodiodes), the conversion rate of the A/D converter has to be very high, e.g., above 100 kHz, in order to achieve a time resolution of 100 data points per second for each photodiode. Furthermore, in order to ensure high measuring accuracy in spectrophotometric applications, the resolution has to be high (preferably larger than 16 bit) and a good linearity must be ensured. In order to fully meet these requirements, a complex and expensive A/D converter would be required. As a compromise between speed and resolution on one side and cost and complexity on the other side, most prior art photodiode arrays use A/D converters of the type "successive approximation". Such A/D converters, however, suffer from differential non-linearities, known as "missing codes". Such errors in the A/D conversion limit the detection limit in spectrophotometry for chemical analysis where small differences in intensity have to be measured.

SUMMARY OF THE INVENTION

Relative to the prior art, it is an object of the invention to provide a photodiode array which substantially avoids the mentioned disadvantages of the prior art, in particular spectra distortions.

According to an underlying principle of the invention, a separate A/D converter is connected to each photodiode for converting the signal corresponding to the intensity of the light impinging on the photodiode into a digital signal. Since an A/D converter is associated with each photodiode, it is possible to provide digital signals representing the light intensity values for all photodiodes of the array simultaneously. This is in contrast to the prior art photodiode arrays wherein such digital signals are provided successively. Thus, the photodiode array of the invention avoids the signal delays of the prior art and thus avoids the spectra distortions which are caused by such delays.

Furthermore, since the requirements regarding speed of the A/D conversion are not quite as high in the invention as in the prior art wherein the signals from a plurality of photodiodes have to be converted very quickly so that the time delay between the conversion of the signals from the first and the last photodiode does not become too large, an integrating type A/D converter can be used in a photodiode array according to the invention. Such an integrating type A/D converter has the advantage of very high linearity and is thus a substantial improvement relative to known photodiode arrays using successive approximation type A/D conversion.

In a preferred embodiment of the invention, the photodiodes are reverse biased and act as a current source with the current being proportional to the incident light level. The A/D conversion according to this embodiment is accomplished as follows : Each photodiode is connected to the summing node of an integrator which continuously accumulates the charge corresponding to this current. A controllable current source is provided for superimposing an adjustable current on the current from the photodiode with the magnitude and polarity of the superimposed current being selected such as to keep the output signal of the integrator at a predetermined level. The controllable current source is preferably designed as a charge dumping mechanism for dumping charge to and/or from the integrator. The output signal of the integrator is periodically compared to a predetermined signal level, and in response to these comparisons, charge dumps to and /or from the integrator are performed in order to keep the output signal at a predetermined level. The number of such dumps during a predetermined time interval (integration time) are counted. This number is a digital representation of the photocurrent and thus of the light intensity impinging on the photodiode. The described A/D conversion technique is of an integrating type and thus ensures very good linearity of the conversion process.

The charge dumping circuitry can be designed in a bipolar way for dumping charge to and from the integrator, or in a unipolar way for dumping charge only in one direction. In the first case, the dumping circuitry can be built by using a capacitor and four switches, in the second case, two switches and a capacitor are sufficient.

In summary, the invention provides the following advantages over the prior art:

Since an A/D converter is associated with each photodiode, simultaneous and independent operation of each of the signal channels comprising one photodiode, respectively, is possible so that the above mentioned spectra distortion problems are avoided.

The feature of simultaneous and independent operation of each of the signal processing channels further offers a very important advantage in the quantitative analysis of chromatographic signals by eliminating the limitations of a method known as optical reference compensation. With this method, a reference signal at a wavelength range where the constituent to be analyzed does not absorb is continuously monitored and subtracted from a sample signal at a wavelength range where the constituent does absorb. With this method of optical reference compensation, one can suppress correlated noise and drift sources in the measurement system such as flicker noise of the light source, refractive index effects of the mobile phase and temperature drift of the electronics. The method of compensation of these correlated noise and drift sources requires that the signals of the sample and reference wavelength are in phase as known from the theory of superimposing two harmonic waves. Since the signals from the individual photodiodes of an integrating photodiode array are processed sequentially, the signal from the reference wavelength is delayed relative to the signal of the sample wavelength. This results in a phase shift of the reference signal depending on the frequency of the correlated noise signal. The remaining amplitude of the correlated noise source of the corrected signal is determined by the vector addition of the two signals and can even be amplified at certain frequencies when the phase shift is in the range between 90 and 180 degrees. Thus, this method of optical reference compensation is not always useful with prior art photodiode arrays. With the simultaneous processing of the signals according to the invention, however, there is no phase shift and the correlated noise source can be completely compensated. This results in an improvement of the signal/noise ratio which in tun leads to better quantitative results in chromatographic analysis.

Even though each signal channel includes an A/D converter, the resulting circuitry is yet simple and requires only a small number of components. The photodiodes can be integrated together with the A/D converters on a single chip, thus leading to a space-saving arrangement. The resulting size of the chip is still in the same order of magnitude as prior art photodiode arrays. The area needed to build one complete channel is nearly the same which is needed for building the capacitor to accumulate the charge during the integration interval in prior art photodiode arrays. The size of the capacitors used in a photodiode array of the present invention is orders of magnitudes smaller than such a charge accumulating capacitor of the prior art. The possibility to integrate the photodiodes and signal processing circuitry including A/D converter on a single chip also leads to a cost reduction relative to prior art devices wherein the signal processing circuitries with A/D converters are arranged as discrete components on separate printed circuit boards.

A further advantage of the integration on a single semiconductor chip consists in an improved temperature drift behavior of the signal electronics. The reason for this is that all components on the chip are subject to substantially the same temperature, so that the drift contribution of many components is canceled.

The photodiode array of the invention has the additional advantage of low noise because the number of signal processing stages is kept small. A further contribution to low noise is the fact that the A/D conversion in a preferred embodiment of the invention is performed by a charge dumping mechanism wherein the number of dumps is proportional to the incident light intensity. Thus, the number of dumps is small for small light intensities which results in an improved signal/noise ratio for small signals.

BRIEF DESCRIPTION OF THE DRAWINGS

FIG. 2b and 2c are timing diagrams illustrating the switching operation of the current source shown in FIG. 2a.

DETAILED DESCRIPTION OF PREFERRED EMBODIMENTS

Figure 1:
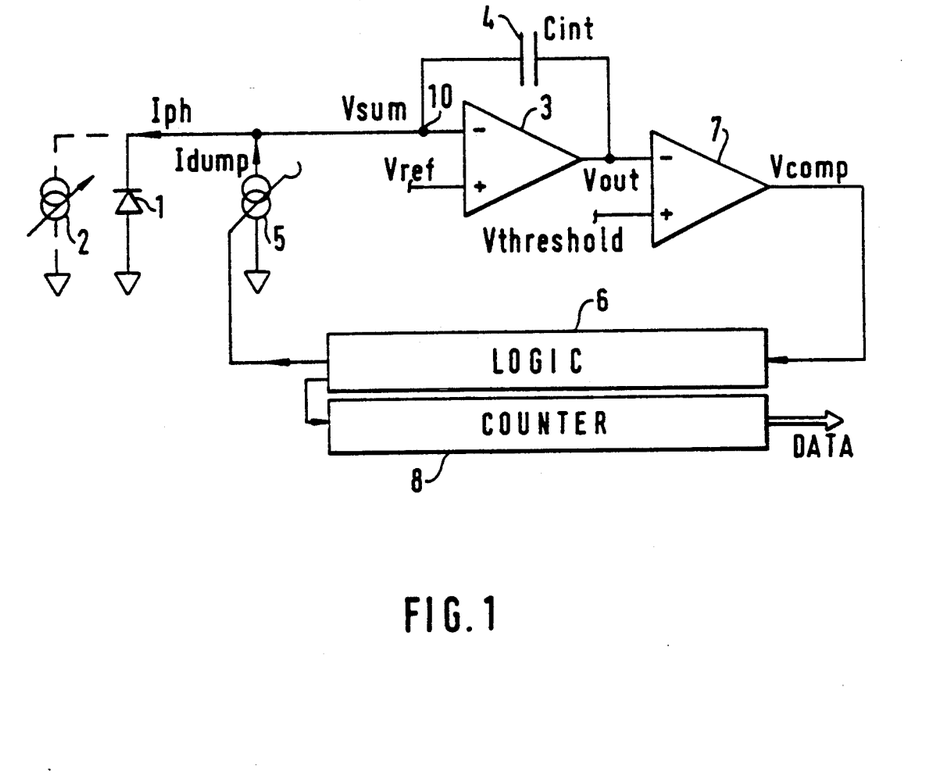
FIG. 1 is a schematic diagram of one of the signal processing channels in a photodiode array according to the invention.
Figure 5A:
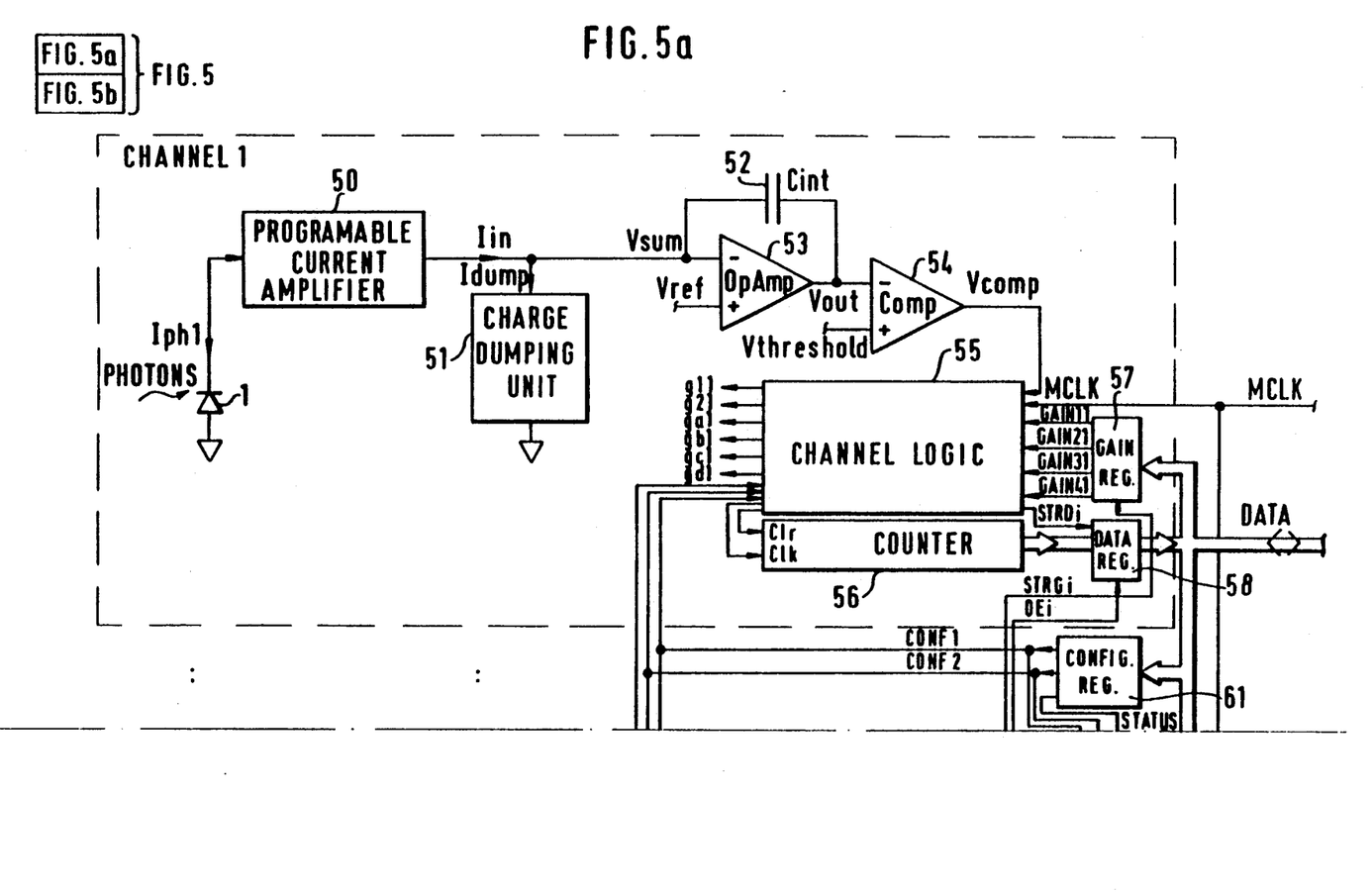
FIGS. 5a-5b are a block diagram of a complete photodiode according to an embodiment of the invention.
Figure 5B:
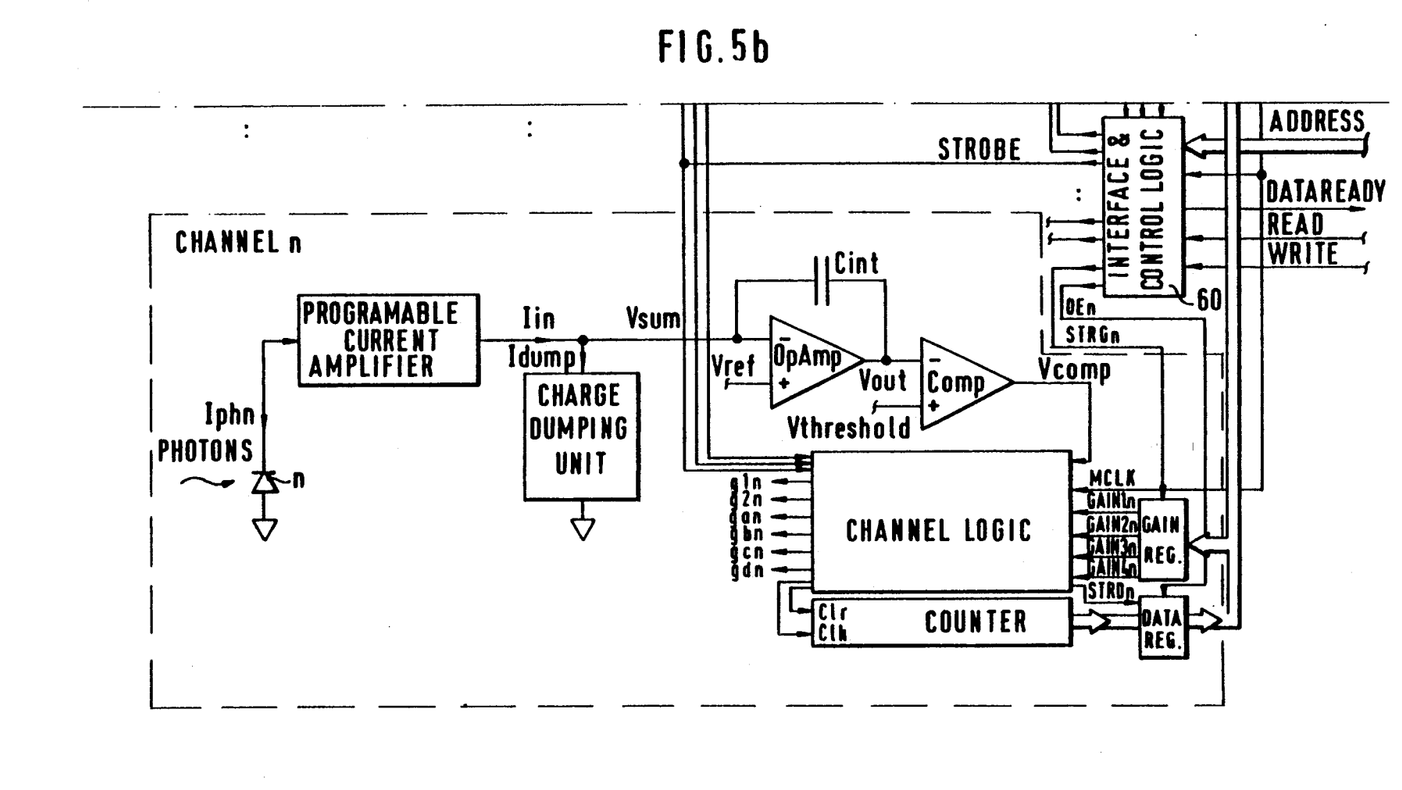

FIG. 1 schematically shows a signal processing channel in a photodiode array according to an embodiment of the invention comprising a photodiode 1 and an associated A/D converter for converting the signal from the photodiode into a digital output signal designated with the word DATA. The complete photodiode array of the invention consists of a plurality of n identical signal processing channels of the type shown in FIG. 1, whereby n is the number of photodiodes of the array which may be of the order of several hundred to about thousand. The n signal processing channels with the n photodiodes can be integrated on a single semiconductor chip. A complete photodiode array according to the invention is shown in FIG. 5.

As shown in FIG. 1, the photodiode 1 is reverse biased and acts as a current source which is symbolically depicted by the current source 2. The current is proportional to the incident light level. The photodiode I is connected to the summing node 10 of an integrator comprising an operational amplifier 3 and a capacitor 4 in its feedback loop. The bias voltage of the photodiode corresponds to the voltage Vsum (virtual Vref) at the summing node 10. An additional current source 5 is provided which can be controlled in response to the output signals of a logic circuit 6. The input of the logic circuit 6 is connected to the output of a comparator 7 the one input signal of which is the output signal Vout of the integrator 3,4 and the other input signal of which is a predetermined signal V threshold. The circuitry shown in FIG. 1 is operative to keep the output signal Vout of the integrator 3,4 at the predetermined value V threshold. In order to achieve that, the logic circuit 6 controls the current source 5 such that it periodically dumps charge into or from the integrator 3,4. The number of charge packets dumped into the integrator during a predetermined integration time is counted by the counter 8 and is a digital measure of the photocurrent Iph produced by the photodiode 1. According to an embodiment of the invention, the length of the integration time is programmable and determines the resolution of the A/D converter. The integration time is proportional to $2^n$, where n is the resolution of the A/D converter in number of bits.

Figure 2A:
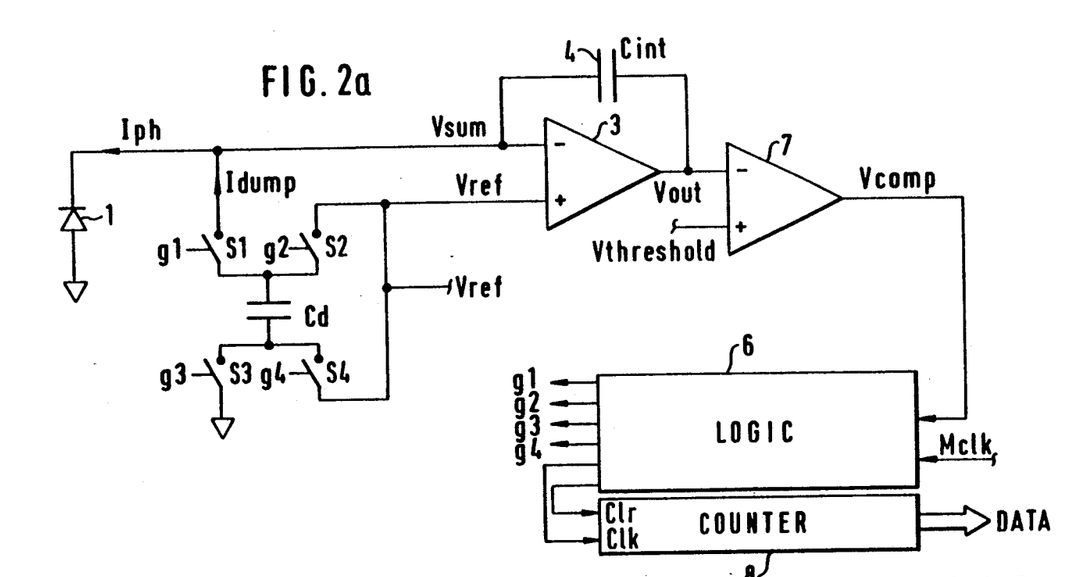
FIG. 2a shows the circuitry according to FIG. 1 with a more detailed view of the current source.

FIG. 2a shows the circuitry of FIG. 1 whereby a specific embodiment of the current source 5 is depicted in more detail. This embodiment permits to transfer ("dump") charge from the current source 5 to the integrator 3,4 as well as from the integrator. With this embodiment, which will subsequently be referred to as "bipolar", it is possible to process input currents of both polarities. The current source or "dumping mechanism" is realized with switched capacitor technique and comprises a capacitor Cd and four switches S1, S2, S3, and S4. Current is driven into the summing node of the integrator by first charging up the capacitor Cd to the voltage Vd by closing the switches S2 and S3 and subsequently dumping the charge onto the integrator by closing the switches S1 and S4.

Figure 2B:
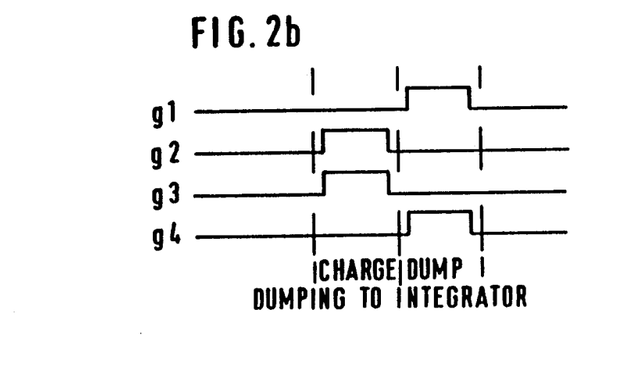
Figure 2C:
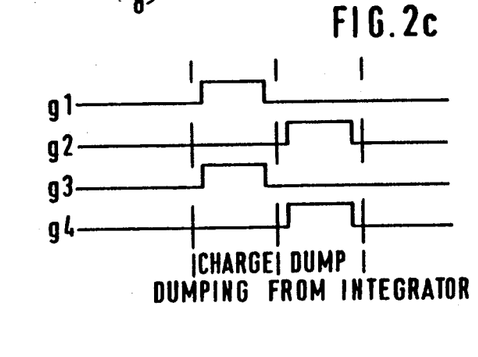

The switching operation of the switches S1 to S4 for such transfer of charge to or from the integrator is illustrated by the timing diagrams of FIGS. 2b and 2c wherein g1 to g4 represent the control signals for operating the switches S1 to S4, respectively. FIG. 2b illustrates the situation that charge is dumped to the integrator, and FIG. 2c illustrates the situation that charge is dumped from the integrator. A pulse in the signals g1 to g4 represents a closed switch.

For transferring charge to the integrator, the switches S2 and S3 are closed in order to charge the capacitor Cd to Vref. Thereafter, charge is dumped to the integrator by closing the switches S1 and S4. The charging phase and the dumping phase are designated with "Charge" and "Dump", respectively, in FIG. 2b. According to FIG. 2c, charge is removed from the integrator by first charging the capacitor Cd to the voltage Vsum (virtual Vref) by closing the switches S1 and S3 and then subsequently empty the charge by closing the switches S2 and S4.

The A/D conversion of the photocurrent Iph is performed as follows: The comparator 7 is periodically activated to compare the signals Vout and Vthreshold at its inputs and to produce an output signal Vcomp which corresponds to a logical "1" if Vout is greater than Vthreshold, and which corresponds to a logical "0" if Vout is smaller than Vthreshold. If Vcomp corresponds to logical "1", the logic circuit 6 will initiate a dump to the integrator by corresponding activation of the switches S1 to S4. This will result in a negative voltage step at the output of the integrator. If Vcomp corresponds to logical "0", the logic circuit 6 will initiate a dump from the integrator. With this negative feedback characteristics, the integrator output signal Vout will always stay within a determined voltage range around Vthreshold. This range depends on the capacitance Cint of the capacitor in the integrator and on the quantity of the charge of a dump. If the photocurrent Iph equals zero, the number of dumps from the integrator equals the number of dumps to the integrator. If the current is driven out of the summing node of the integrator by the photodiode, the number of dumps to the integrator exceeds the number of dumps from the integrator. In case that the photocurrent equals the upper limit (Iphmax) of the operating range of the A/D converter, all dumps are directed to the integrator. Above Iphmax, the charge accumulated by the photocurrent exceeds the amount of charge that can be dumped to the integrator. This limit depends on the period of a dump cycle (determined by the main clock frequency, signal Mclk in FIG. 2a), the capacitance Cd of the dump capacitor, and Vref. Vref and the capacitance of the dump capacitor are fixed, but the clock frequency can be chosen by an external oscillator to achieve adaptation to the intensity of the radiation impinging on the photodiodes.

The digital data representing the photocurrent are generated by counting the dumps into one direction during the integration time. The counting is performed by the counter 8. A complete dump cycle for dumping charge to or from the integrator consists of 6 clock cycles of the signal Mclk: 2 clock cycles for the charge phase (charging the capacitor), 2 clock cycles for the dump phase (dumping charge to or from the integrator), and 2 clock cycles to separate both phases. The comparator 7 is always activated at the end of the dump phase and causes the logic circuit 6 to make a decision if the next dump is to be made to or from the integrator and subsequently perform such a dump.

Figure 3A:
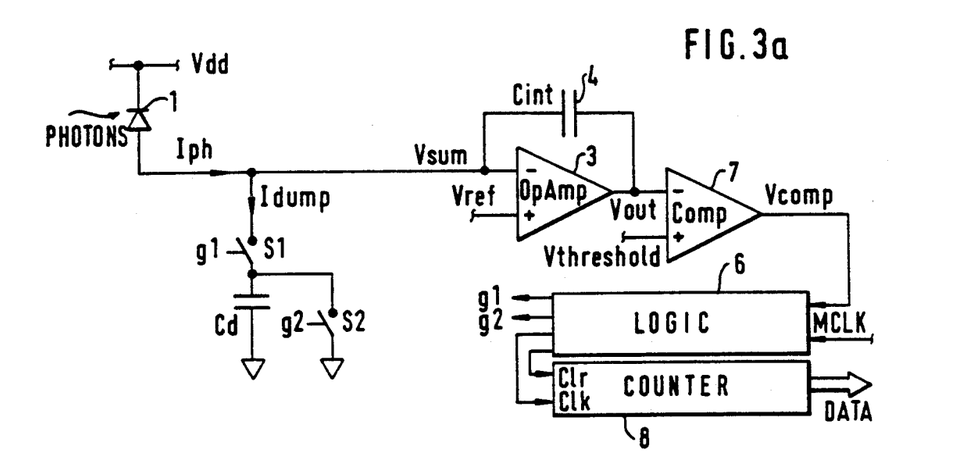
FIG. 3a, shows the circuitry according to FIG. 1 with a more detailed view of an alternative embodiment of the current source.

FIG. 3a shows an embodiment of the invention which has a dumping mechanism only for one direction. This embodiment, which will subsequently be referred to as "unipolar" has the advantage that the dumping mechanism (or current source) requires only two switches in contrast to the bipolar embodiment described above which requires four switches. The electrical arrangement of the photodiode 1 is chosen such that the photocurrent Iph flows out of the summing node of the integrator 3,4. This is achieved by connecting the photodiode 1 between the supply voltage Vdd and the inverting node of the integrator 3,4. The reverse bias voltage Vbias across the photodiode 1 in this case is Vbias=Vdd−Vref. The current source comprises a capacitor Cd and switches S1 and S2. The remaining circuitry of the unipolar embodiment corresponds to the circuitry of the bipolar embodiment described in FIG. 2a. The switching sequence for dumping charge from the integrator consists in first activating the switch S1 to charge the capacitor Cd to the voltage Vsum and subsequently activating the switch S2 to null the capacitor. The quantity of charge Qd removed from the integrator by one dump is Qd=Vref Cd. Here, it is assumed that the operational amplifier 3 works ideally and that Vsum=Vref.

Like in the bipolar embodiment, the digital data corresponding to the photocurrent are generated by counting the number of dumps in one direction, i.e., in this case from the integrator. Another advantage of the unipolar embodiment is an improved signal/noise ratio because of the reduced number of switching operations as compared to the bipolar embodiment.

Figure 3B:
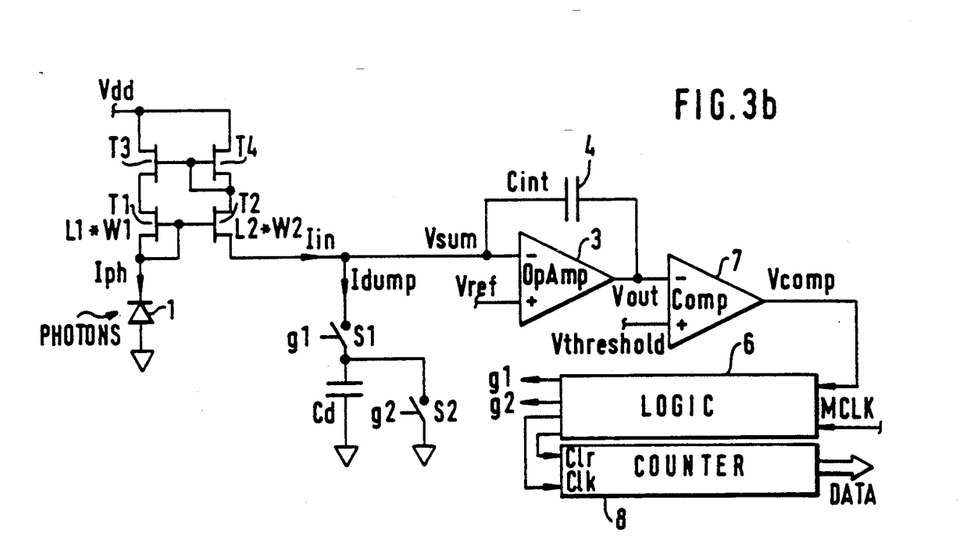
FIG. 3b is an extension of the circuitry of FIG. 3a, additionally comprising a current amplifier.
Figure 3C:
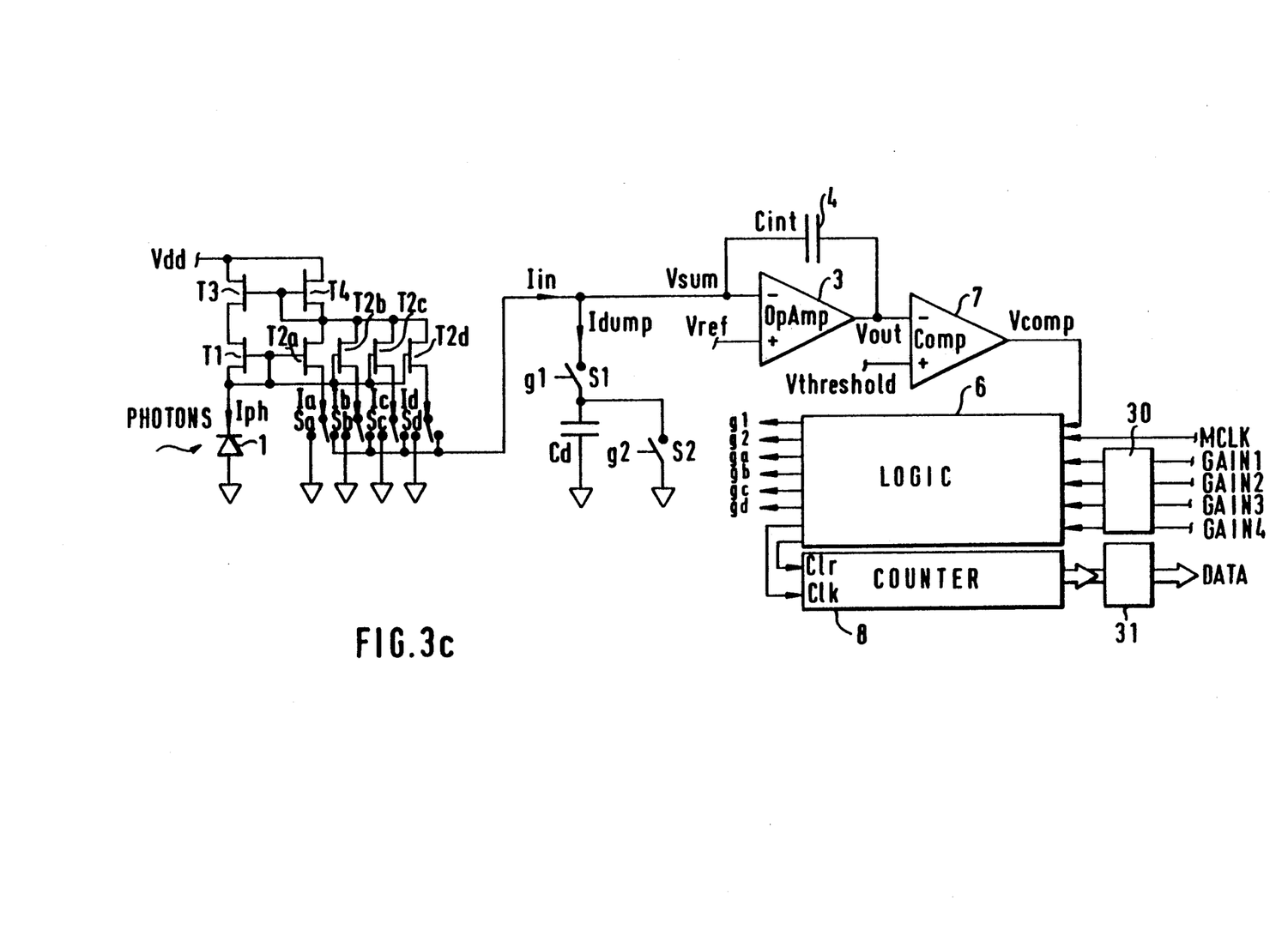
FIG. 3c is an extension of the circuitry of FIG. 3b, wherein the current amplifier is programmable.

In FIGS. 3b and 3c, further embodiments of the unipolar circuitry shown in FIG. 3a are explained. These embodiments differ from the circuitry in FIG. 3a in that additional circuits for amplifying the photocurrent Iph from the photodiode 1 are provided. The reason for providing such current amplification circuits is that the magnitude of the photocurrent varies with the intensity of the light impinging on the photodiode so that, due to varying light intensities, the A/D converter cannot always be operated at its optimum operating point. With the current amplification, however, the photocurrent from lower incident light intensities is amplified more than from higher incident light intensities so that the A/D converter can be operated at optimum conditions.

FIG. 3b shows a first example for a current amplifier to amplify the photocurrent which is known in the art as the Wilson current mirror. This circuit comprises four MOS transistors T1 to T4 connected to the supply voltage Vdd and the photodiode 1 in the way shown in FIG. 3b. The gain factor for the current in this configuration is determined by the aspect ratio of the channel length L and the channel width W of the transistor pair T1, T2. The gain factor g, i.e., the ratio of the photocurrent Iph and the amplified current Iin is given by:

$$g = Iph/Iin = L1/L2 \cdot W2/W1$$

By properly designing the aspect ratios for the transistors T1 and T2, one can easily achieve gain factors up to 50. Among other advantages, the Wilson current mirror has the advantage of a simple circuit design.

In FIG. 3c is shown a refinement of the current amplifier shown in FIG. 3b which allows to achieve a programmable gain factor. This is accomplished by arranging several mirror transistors, for example four transistors T2a, T2b, T2c, T2d in parallel, and by providing corresponding switches Sa, Sb, Sc, Sd to turn the transistors on and off. The aspect ratio of the geometry of the transistors T2a, T2b, T2c, and T2d is designed to achieve a binary weighted current ratio for the currents Ia, Ib, Ic, Id supplied to the switches Sa, Sb, Sc, Sd, respectively, such that the following relationships apply:

$$Ia = Iph \; ; \; Ib = 2Iph \; ; \; Ic = 4Iph \; ; \; Id = 8Iph$$

Since the switches Sa to Sd can be activated independently, any gain factor $g = Iin/Iph$ between 1 and 15 can be adjusted in steps of one.

The desired gain setting can be supplied via lines GAIN 1, GAIN 2, GAIN 3 and GAIN 4 to a gain register 30 from where they are supplied to the logic circuitry 6 which emits corresponding control signals ga, gb, gc, gd for activating the switches Sa, Sb, Sc, and Sd, respectively. The logic circuit 6 furthermore produces output signals g1 and g2 for controlling the switching operation of the switches S1 and S2 of the dumping circuitry. A data register 31 is connected to the output of the counter 8 for receiving the data resulting from the A/D conversion of the photocurrent.

Figure 4A:
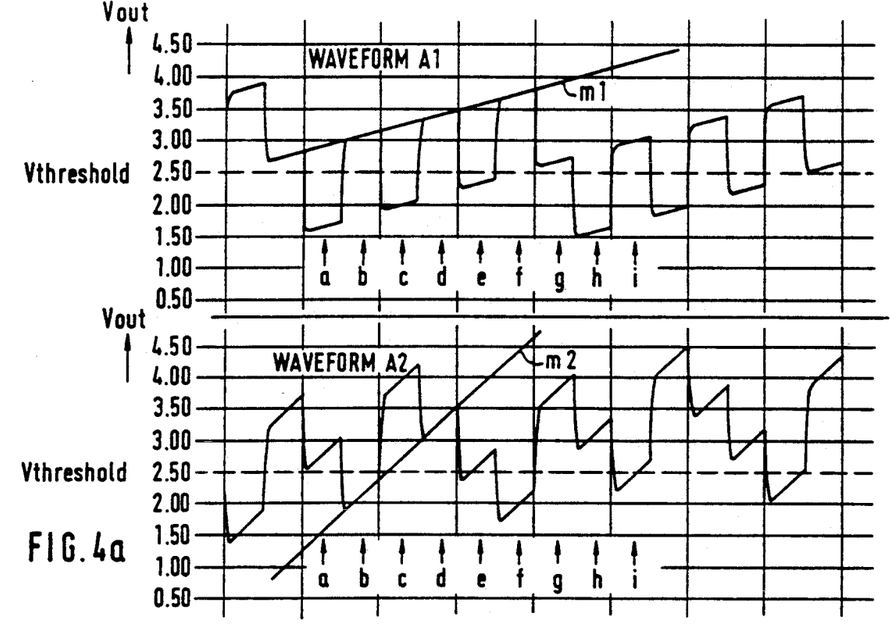
FIG. 4a and 4b are timing diagrams illustrating the A/D conversion of the photocurrent according to the present invention.
Figure 4B:
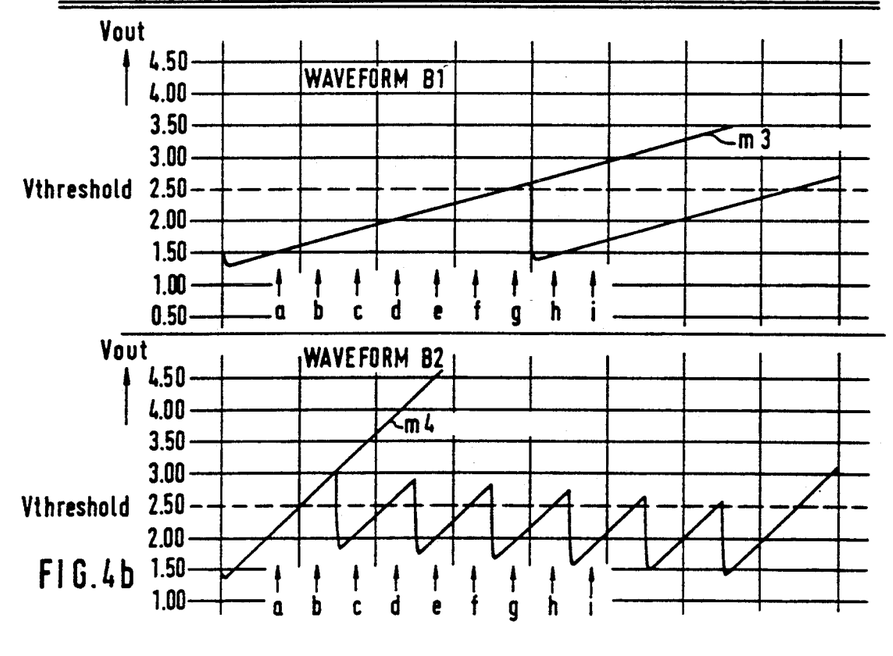

Subsequently, the A/D conversion of the photocurrent Iph according to the above described bipolar and unipolar embodiments are further explained with reference to FIGS. 4a and 4b, respectively. FIG. 4a is a graphical representation of the output voltage Vout of the integrator 3,4 versus time for the bipolar embodiment as in FIG. 2a, wherein the waveforms (A1, A2) in the upper and lower halves correspond to different photocurrents, respectively. FIG. 4b is a graphical representation of the output voltage Vout of the integrator 3,4 versus time for the unipolar embodiment as in FIG. 3a, with the waveforms (B1, B2) in the upper and lower halves corresponding to different photocurrents, respectively.

The waveforms in FIG. 4a and 4b show an up and down movement which represents the dumping of charge to and/or from the integrator. The arrows on the time axis labelled with the letters a to i indicate the points in time when the logic circuit 6 makes a decision if and in which direction a dump is to be made in order to keep the charge on the integrator balanced. FIG. 4a shows dumps in both directions, whereas FIG. 4b shows dumps only in one direction. It can be seen that the resulting waveforms stay within a voltage range around the voltage Vthreshold. The slopes of the waveforms (labelled with m1, m2, m3, m4) are proportional to the photocurrent Iph and inversely proportional to the capacitance Cint. In the example shown, the capacitance Cint is fixed so that the waveforms A1 and B1 (having slopes m1 and m2, respectively) result from a higher photocurrent than the waveforms A2 and B2 (having slopes m3 and m4, respectively).

The digitized value of the photocurrent Iph is obtained by counting the number of dumps in one direction (i.e., in FIG. 4a either in the positive or the negative direction) during the integration time Tint and by calculating therefrom in the manner explained below the value of Iph. FIGS. 4a and 4b show only a small portion of the entire integration time which, depending on the desired resolution of the A/D conversion, may be several thousand times longer than the time portion shown in FIGS. 4a and 4b.

It is to be pointed out that the A/D conversion technique according to the invention behaves like an integrating A/D conversion technique and thus has a good linearity.

In the following, some formulae describing the A/D conversion process and the resulting resolution are derived.

First, the bipolar embodiment is considered, wherein the following abbreviations are used :
  Qph : charge accumulated due to photocurrent Iph during integration time Tint
  Qdall : net quantity of charge provided by dump circuitry to keep the integrator balanced
  Nto : number of dumps to the integrator
  Nfrom : number of dumps from the integrator
  Qto : magnitude of charge packet of one dump to the integrator
  Qfrom : magnitude of charge packet of one dump from the integrator The following relationships apply :
Qph = Qdall
Iph × Tint = Nto × Qto − Nfrom × Qfrom
Let's assume that Qto = Qfrom = Qd and Nfrom = N − Nto, where N is the total number of dumps in both directions for a given integration interval Tint. N can be expressed as to N = Tint / Td, where Td is the execution time of one dump.

$$Iph \times Tint = Qd \times (2 \times Nto - N)$$

with $Qd = Vref \times Cd$, wherein Cd is the capacitance of the dump capacitor, we get:

$$Iph \times Tint = Vref \times Cd \times (2 \times Nto - N)$$

this equation solved for Nto gives:

$$Nto = \frac{Iph \times Tint}{2 \times Vref \times Cd} + \frac{N}{2} = \frac{Iph \times Tint}{2Vref \times Cd} + \frac{Tint}{2 \times Td}$$

Since Vref, Cd and Td are constant and determined by the dimensions of the circuit design, the above equation can be expressed as:

$$Nto = m \times Iph \times Tint + b \times Tint = Tint \times (m \times Iph + b)$$

This form of the equation shows that the number Nto of dumps to the integrator is proportional to the magnitude of the photocurrent Iph but carries an offset of N/2. In order to avoid this offset, one can easily initalize the counter at the beginning of the conversion with a value which represents $(-1) \times N/2$. With this modified algorithm, the status of the counter at the end of conversion interval is proportional to the magnitude of the photocurrent.

The resolution of the A/D converter is defined by:

$$\text{Resolution} = \frac{\text{Range of } Iph}{\text{Range of DATA}} \quad (A/Lsb = \text{Ampere/least sig. bit})$$

Using the above derived formulae, the following equations apply for "Range of Iph" and "Range of DATA", wherein Iphmax and Iphmin are the maximum and minimum photocurrents which can be processed by the A/D converter and Range of DATA is the corresponding interval of digital data:

Range of Iph = Iphmax − Iphmin $$\text{Range of DATA} = \left(\frac{Iphmax \times Tint}{2Vref \times Cd} + \frac{N}{2}\right) -$$

$$\left(\frac{Iphmin \times Tint}{2 \times Vref \times Cd} + \frac{N}{2}\right)$$

$$= \frac{(Iphmax - Iphmin) \times Tint}{2Vref \times Cd}$$

This yields the following expression for the resolution:

$$\text{Resolution} = \frac{\text{Range of } Iph}{\text{Range of DATA}} = \frac{2 \cdot Vref \cdot Cd}{Tint} \quad [A/Lsb]$$

In the following, the unipolar embodiment is considered wherein the following abbreviations are used:
Qph : charge accumulated due to photocurrent Iph during integration time Tint
Qdall : net quantity of charge provided by dump circuitry to keep the integrator balanced
Nd : number of dumps from the integrator
Qd : magnitude of charge packet of one dump from the integrator
The following relationships apply:
Qph = Qdall
Iph·Tint = Nd·Qd
with Qd = Vref·Cd, we obtain:
Iph·Tint = Vref·Cd·Nd
This equation solved for Nd gives:

$$Nd = \frac{Iph \cdot Tint}{Vref \cdot Cd}$$

The resolution of the A/D converter is given by:

$$\text{Resolution} = \frac{\text{Range of } Iph}{\text{Range of DATA}} = \frac{Vref \cdot Cd}{Tint} \quad [A/Lsb]$$

It is to be pointed out that the resolution in the unipolar embodiment is by a factor of 2 better than in the bipolar embodiment, assuming that the same integration time Tint and the same values for Vref and Cd, respectively, are used. Furthermore, the number of dumps Nd from the integrator is directly proportional to the photocurrent Iph without an offset as in the bipolar embodiment.

As derived above, the resolution of the A/D converter for both the bipolar and the unipolar embodiment is dependent on Vref, Cd, and Tint. Once Vref and Cd are selected, the resolution is only dependent on the integration time Tint. This offers the possibility to create an A/D converter with programmable resolution. The resolution can be adjusted by controlling the integration time Tint, which corresponds to the time interval between initializing the counter 8 in the embodiments of FIGS. 1 and 3a and reading the status of the counter.

In the following, a complete photodiode array according to an embodiment of the invention is described with reference to the block diagram of FIG. 5. This embodiment is designed for the above described unipolar mode wherein charge is only dumped in one direction for performing the A/D conversion. The photodiode array comprises n channels (Channel 1 ... Channel n), each channel including a photodiode (1, ..., n) and subsequent circuitry for amplification and A/D conversion of the photocurrents (Iph1, .... Iphn). In particular, each channel comprises (the reference numerals in the following paragraph apply for Channel 1): a programmable current amplifier 50, a charge dumping unit 51, an integrator circuit 52, 53, a comparator 54, a logic circuit 55 and a counter 56. This circuitry functions in the way described above to perform the A/D conversion of the photocurrent from the phototodiode 1. Furthermore, each channel includes a gain register 57 for storing the amplification factor for the photocurrent for each channel and a data register 58 for receiving the digital value resulting from the A/D conversion. According to an embodiment of the invention, the number n of channels is 128, but it is understood that a photodiode array according to the invention may comprise any number of channels (i.e., photodiodes).

The n photodiodes and the corresponding A/D conversion circuitry as described above can be integrated on a single semiconductor chip, whereby the circuitry associated with each photodiode in a channel can be arranged in a space saving manner on the chip subsequent to the photodiode. This chip is preferably connected to a microprocessor (not shown) via two bus lines labelled with DATA and ADDRESS and three control lines labelled with DATAREADY, READ, and WRITE. The communication between the microprocessor and the photodiode array is handled by the interface & control logic 60. The principle of operation is similar to the way a random access memory (RAM) communicates with a microprocessor. A signal corresponding to logical "0" on the line WRITE controls the storing of gain information into the gain registers (e.g., 57) from the DATA bus, whereby the signals on the ADDRESS bus control to which of the gain registers the gain information is transferred.

There is also provided a configuration register 61 for receiving information relating to the conversion rate and the resolution of the A/D converter. This information is provided in a coded representation on the lines CONF1 and CONF2 to all n logic circuits (e.g., logic circuit 55) and the interface & control logic 60. The reading of the data registers (e.g., data register 58) is controlled by the signal READ. If the signal READ corresponds to logical "0", the associated signal line OE i (i being a number from 1 to n) is activated which in turn opens the tristate buffers of the data registers according to the address applied on the ADDRESS bus so that the contents of the corresponding data register is available on the DATA bus and can be taken over by the microprocessor.

The signal DATAREADY is used to indicate to the microprocessor the availability of new digital data generated by the A/D converter at the end of the integration time. This signal acts as an interrupt signal to force the microprocessor to sequentially read the digital data from all the n channels for further processing.

The interface & control logic 60 controls the integration time by comparing the count of clock cycles with a value derived from the parameter setting for the A/D converter resolution stored in the configuration register 61. The clock cycles are recorded with a clock counter which is part of the interface & control logic 60. The number of clock cycles Nclock within the selected integration time is given by: $Nclock = 6 \cdot 2^n$, wherein n represents the A/D converter resolution in number of bits and the factor 6 indicates that six clock cycles are required for one dump. For a resolution of the A/D converter of 16 bits, for example, the integration time corresponds to 393216 clock cycles. For a main clock frequency (signal Mclk) of 39,216 MHz, for example, this results in an integration time Tint=10 ms or in a conversion rate of 100 Hz.

At the end of the integration time, the interface & control logic 60 emits a trigger signal via the line STROBE to each channel logic circuit (e.g., channel logic circuit 55). Each of the logic circuits in turn generates a signal on a line STRDi (i being a number between 1 and n) which causes storing of the contents of the corresponding dump counter (e.g., counter 56) into the associated data register (e.g., register 58). The signal STRDi also causes the corresponding logic circuit to generate a signal Clr which initializes the associated dump counter for the next integration period. At the same time, the signal DATAREADY is activated. It will be deactivated by an acknowledgement signal from the microprocessor by setting a flag (one bit) in the configuration register 61.

The logic circuit (e.g., circuit 55) of each channel generates four control signals gai, gbi, gci, gdi (i being a number between 1 and n) for controlling the programmable current amplifier of the type shown in FIG. 3c. Furthermore, each logic circuit generates two control signals g1i, g2i for controlling the switches of the charge dumping unit (e.g., charge dumping unit 51), whereby the charge dumping unit is of the type shown in FIG. 3a. As already mentioned, each logic circuit also provides the signals for clocking and resetting the associated counter (signals Clr and Clk) and for storing the result of the A/D conversion in the associated data register. The waveforms of the signals g1i and g2i are dependent on the current Iin provided by the current amplifier.

Figure 6:
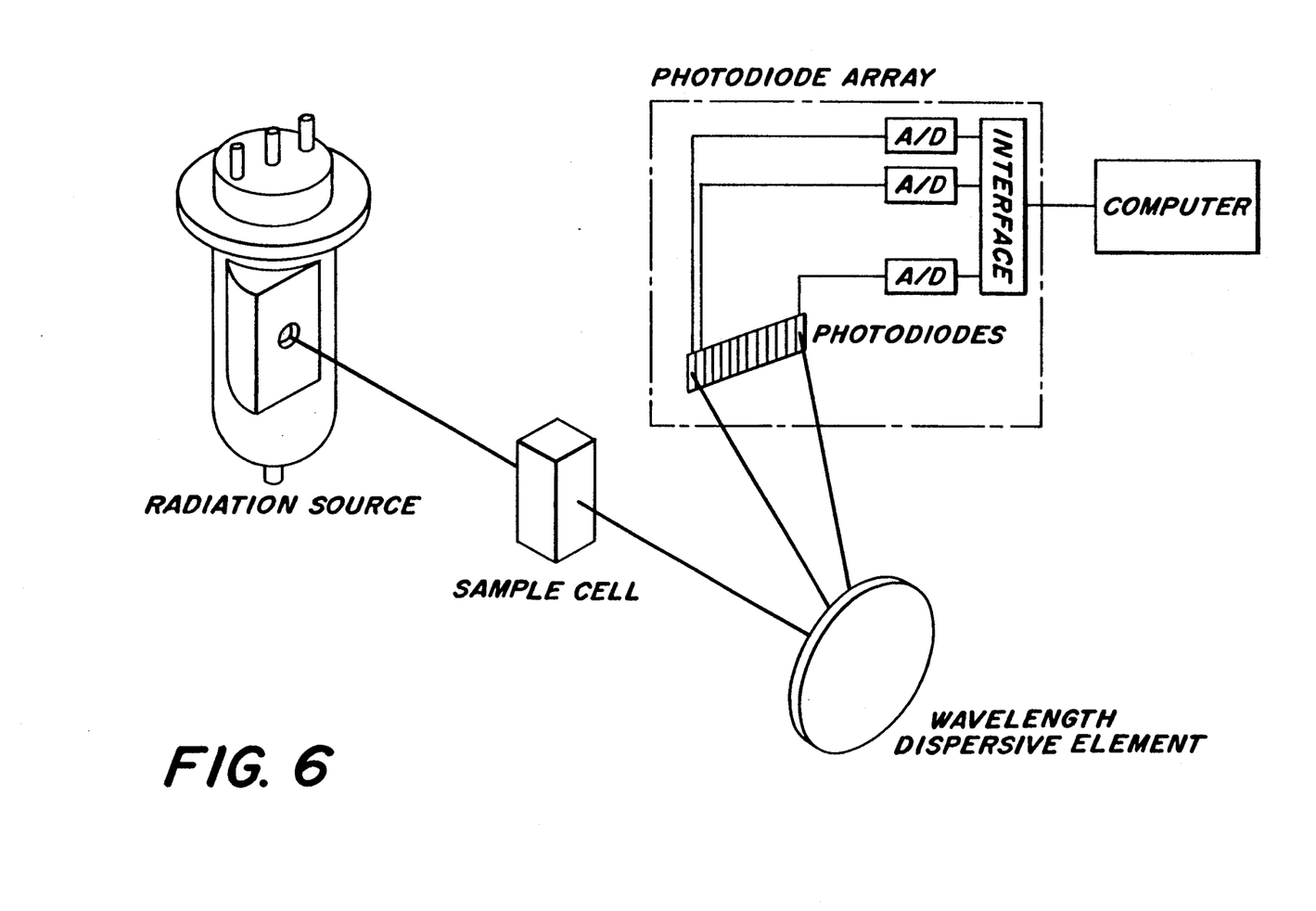
FIG. 6 is a block diagram depicting the inventive photodiode array in combination with a spectrophotometer comprising a radiation source, a sample cell, a wavelength dispersive element, and a computer.

FIG. 6 is a block diagram of a photodiode array in accordance with the present invention, cin combination with a spectrophotometer comprising a radiation source, a sample cell, a wavelength dispersive element, and a computer, as disclosed in the foregoing specification.

What is claimed is:

1. A photodiode array comprised a plurality of n channels, each channel comprising a photodiode which is reverse biased such that it acts as a current source, and A/D converter means for providing a digital output signal which is representative of the photocurrent provided by that channel's photodiode; each A/D converter means comprising a controllable current source, an integrator circuit, a comparator for comparing an output signal of the integrator circuit with a predetermined signal, and a logic circuit for controlling the current source in response to the output signal of the comparator such that the output signals is kept within a pre-defined range.

2. Photodiode array as in claim 1, wherein the current source comprises a capacitor and a plurality of switches which are activated n response of control signals supplied by the logic circuit such that charge can be dumped to and/or from the integrator circuit by corresponding charging and discharging of the capacitor.

3. Photodiode array as in claim 1, comprising a current amplifier for amplifying the current provided by the photodiode before analog-to-digital conversion.

4. Photodiode array as in claim 3, wherein the current amplifier comprises a wilson current mirror.

5. Photodiode array as in claim 3, wherein the current amplifier has a programmable gain.

6. Photodiode array as in claim 5, wherein currents (Iph) of low magnitude are amplified with a higher gain than currents of high magnitude.

7. Photodiode array as in claim 1, wherein the photodiodes and the A/D converter means associated with the photodiodes, respectively, are integrated on a single semiconductor chip.

8. A photodiode array s in claim 1 in combination with a spectrophotometer comprising a radiation source for remitting a polychromatic beam of radiation, a sample cell through which the said beam is transmitted, and a wavelength dispersive element for receiving the beam leaving the sample cell and for generating an outgoing beam comprising a plurality of spatially separated rays of different wavelengths which are directed on the photodiode array.

* * * * *